United States Patent [19]

Cannon

[11] Patent Number: 5,056,029

[45] Date of Patent: Oct. 8, 1991

[54] METHOD AND APPARATUS FOR MANUFACTURING AND VENDING SOCIAL EXPRESSION CARDS

[76] Inventor: Thomas G. Cannon, 8017 Glade Rd., Loveland, Colo. 80537

[21] Appl. No.: 408,773

[22] Filed: Sep. 18, 1989

[51] Int. Cl.⁵ .............................................. G06F 15/20
[52] U.S. Cl. ..................... 364/468; 364/400; 364/419; 364/479; 364/518
[58] Field of Search .............. 364/468, 478, 479, 400, 364/419, 514, 518, 521, 188, 189

[56] References Cited

U.S. PATENT DOCUMENTS

| | | | |
|---|---|---|---|
| 3,864,708 | 2/1975 | Allen | 354/290 |
| 3,990,710 | 11/1976 | Hughes | 274/1 R |
| 4,359,631 | 11/1982 | Lockwood et al. | 235/381 |
| 4,449,186 | 5/1984 | Kelly et al. | 364/407 |
| 4,528,643 | 7/1985 | Freeny Jr. | 364/900 |
| 4,616,327 | 10/1986 | Rosewarne | 364/400 X |
| 4,674,041 | 6/1987 | Lemon et al. | 364/401 |
| 4,677,565 | 6/1987 | Ogaki et al. | 364/479 |
| 4,712,174 | 12/1987 | Minkler II. | 364/200 |
| 4,723,212 | 2/1988 | Mindrum et al. | 364/401 |
| 4,727,589 | 2/1988 | Hirose et al. | 382/56 |
| 4,750,151 | 6/1988 | Baus | 364/900 |
| 4,951,203 | 8/1990 | Halamka | 364/419 |

Primary Examiner—Joseph Ruggiero
Attorney, Agent, or Firm—James R. Young

[57] ABSTRACT

Apparatus for point of sale card manufacturing and vending includes an information storage and retrieval system for storing, referencing, and retrieving various social expression card designs from a database. A querying device queries the customer to input a series of special occasion parameters to define the field of social expression card desired, while a display device displays the various social expression card designs. A social expression card reproducing device manufactures the selected social expression card design, and a valuable medial acceptor accepts payments for the manufactured card. The functions and operations of the above components are controlled by a computer.

21 Claims, 13 Drawing Sheets

METHOD AND APPARATUS FOR MANUFACTURING AND VENDING SOCIAL EXPRESSION CARDS

BACKGROUND OF THE INVENTION

1. Field of the Invention

The present invention relates to greeting cards in general, and particularly to a method and apparatus for the display of greeting card designs and the on-site manufacture and sale thereof.

2. Brief Description of the Prior Art

Currently, greeting, or social expression, cards are usually manufactured in large quantities by various manufacturers at locations remote from the point of purchase or retail outlet. Social expression cards include greeting cards, invitations, announcements, and the like and are referred to herein as "greeting cards" or "social expression" cards. After manufacture, the cards are shipped, either directly or through wholesale distributors, to a variety of retail outlets, such as specialty card shops, drug stores, grocery stores, and the like where they are displayed and sold to retail customers.

One of the most significant problems associated with the remote manufacture of greeting cards is the very large amount of inventory needed at the point of sale, and the space required to properly display the inventory of greeting cards. For example, most greeting, or social expression, cards are displayed on card racks that group the cards into a number of categories, or fields, in an attempt to assist a customer in locating the type of card he or she desires. Typically, signs are attached to the display racks at various points to indicate the general category, or field, of the cards in that particular section. Such fields usually include cards for birthday, wedding, anniversary, graduation, and other occasions. Another display scheme utilizes color coding of certain sections of the display rack to indicate the particular field of that section. No matter what the display scheme, however, a large display rack is needed to expose a sufficient portion of the face of each card to allow easy scanning by the customer of the various cards available in a particular category or field.

For many years, greeting, or social expression, cards were generally confined to themes relating to traditional holidays and special occasions, such as birthdays or anniversaries, and consequently did not require a particularly large display rack. Furthermore, since such traditional holidays are seasonal, a portion or section of the display rack could be used alternately for different holiday occasions. In this manner, the section of the display rack used to display Christmas cards in December could be used to display Valentines cards in February. Therefore, this multiple use of display space allowed most retail stores to maintain a large enough inventory of greeting cards to remain competitive while requiring a relatively small amount of space to be reserved for the display rack.

Recently, however, new categories, or fields, of greeting cards have been introduced that have themes relating to friendship, business and other everyday activities. In addition, greeting cards have been introduced that cater to people of various ages, personalities and lifestyles. While this increase in the number of fields of greeting cards has resulted in a greater range and selection for the customer, it has also created a number of problems.

First, the increase in the number of fields has placed ever increasing demands on the amount of display space a retail outlet must have to remain competitive. For example, it is not unusual for a card specialty store to have in excess of 5,000 different card designs occupying over 200 lineal feet of display. A typical drugstore likewise often averages 160 lineal feet, while a supermarket averages, because of space restrictions, about 45 feet. Stores which lack the space required to display a large inventory of cards have been known to lose customers to competitors who are able to display more cards.

Second, this increase in display area has made it difficult and time consuming for a card buyer to locate an appropriate card for a given occasion. It is also increasingly more difficult for a card buyer to direct his or her search to a specific greeting card field, since the specific field is quite often dispersed throughout the display rack, depending on the particular card manufacturer.

SUMMARY OF THE INVENTION

Accordingly, it is an object of the present invention to provide an improved method and apparatus for the display and sale of greeting cards in a retail setting.

It is another object of this invention to provide a method and apparatus for custom manufacturing and vending greeting cards at a point of sale location.

It is a further object of this invention to eliminate the large physical inventory of various greeting card fields and designs required at retail outlets.

It is yet another object of this invention to reduce the amount of display space required to display a full range of greeting card fields and designs.

It is still another object of this invention to provide a new and improved method for consumer selection of greeting cards.

Additional objects, advantages, and novel features of the invention will be set forth in part in the description that follows, and in part will become apparent to those skilled in the art upon examination of the following, or may be learned by the practice of the invention. The objects and advantages of the invention may be realized and attained by means of the instrumentalities and in combinations particularly pointed out in the appended claims.

In achieving these and other objects, a method and apparatus has been provided for on-site manufacture and vending of greeting cards. The method first requires that a database of various card fields and designs be input into an on-site greeting card manufacturing and vending machine. Each card design in the database is uniquely identified by a number of special occasion parameters that identify the field of the greeting card. For instance, some parameters may identify whether the card is a birthday or anniversary card, while other parameters may further define other relative characteristics of the card, such as a particular age for a birthday card, or the specific year of the anniversary card. Together, these parameters serve to group a number of cards within a variety of particular fields. Once the on-site greeting card manufacturing and vending machine is provided with this database, the customer is queried and prompted to input a plurality of special occasion parameters, thereby defining the field of the greeting card desired. Once these special occasion parameters have been input, the database is searched for card designs that correspond to the special occasion parameters input by the customer. The corresponding card designs are then displayed for the customer, who may input a selection of a greeting card design to be reproduced. A card with the selected design is then manufactured on-site by the machine and vended to the customer.

The on-site or point of sale card manufacturing and vending machine comprises an information storage and retrieval device for storing, referencing, and retrieving various card designs from the database. A querying device is used to query the customer to input the special occasion parameters to define the field of card desired, while a display device displays the various card designs for the customer. A reproducing device manufactures the selected card design, and a valuable media acceptor accepts payments for the card to be manufactured. A computer controls the function and operation of the above components of the on-site greeting card manufacturing and vending machine.

BRIEF DESCRIPTION OF THE DRAWINGS

"The accompanying drawings, which are incorporated herein and form a part of the specification illustrate preferred embodiment of the present invention, and together with the description, serve to explain the principles of the invention. In the drawings.

DETAILED DESCRIPTION OF THE PREFERRED EMBODIMENT

Figure 1:
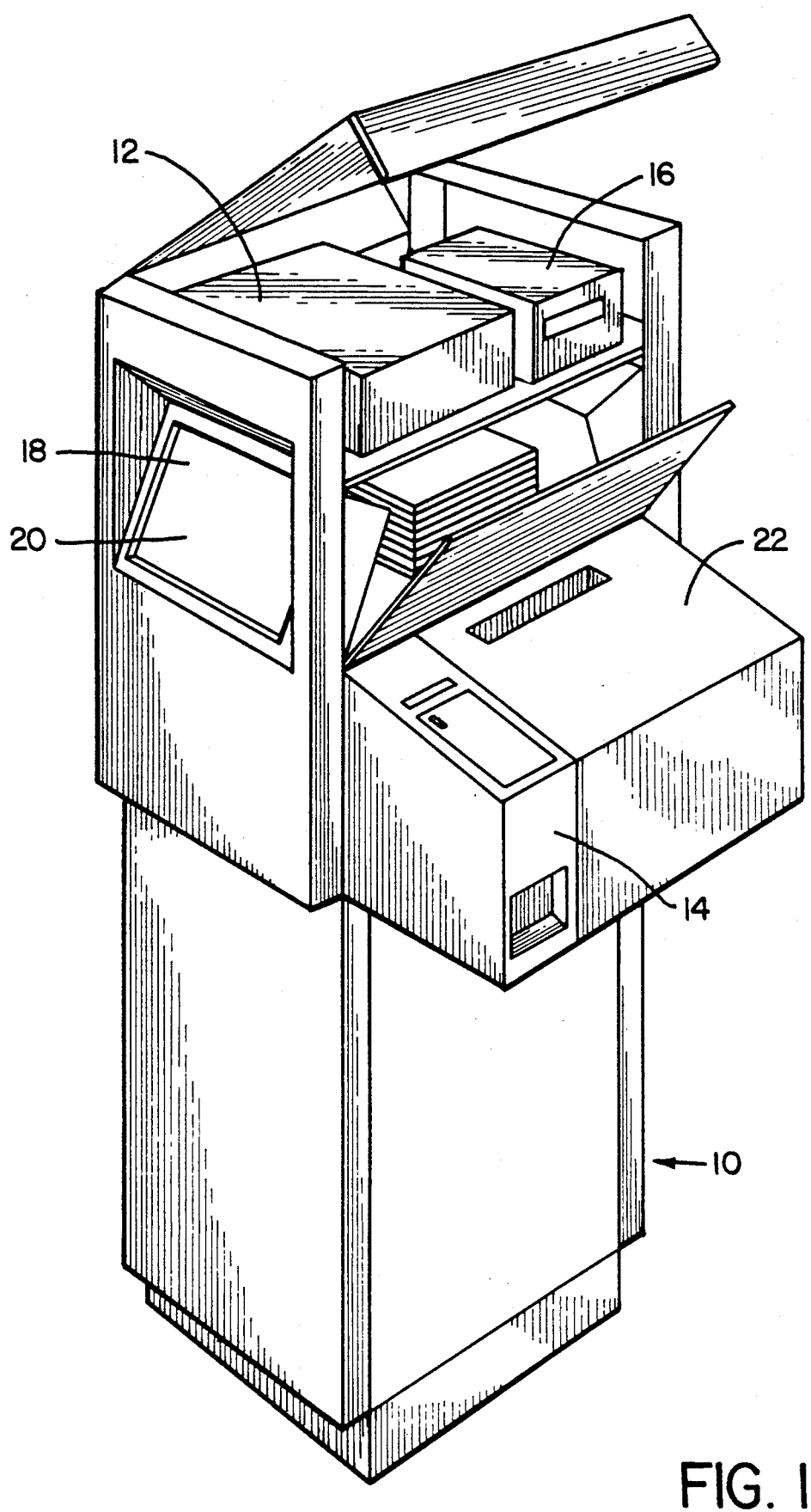
FIG. 1 is a perspective view of a machine for the on-site manufacture and vending of greeting cards embodying the present invention.

The on-site greeting card manufacturing and vending machine 10 of the present invention shown in FIG. 1 provides a system for on-site display, selection, manufacture, and sale of greeting cards. In this configuration, a customer interacts with a touchscreen 20, and optionally, a coin acceptor 14 or other qualifier device. During the card selection process, an interactive querying process displays a number of queries and options for the customer on the screen 20. The purpose of these queries is to define the field of search for the particular card category desired. Once this field has been defined by an interactive query process, which will be described in more detail below, the information storage and retrieval unit 16 of the machine 10 searches the database of card designs and displays those card designs found to be within the previously defined category or field on the screen 20. The customer views the various card designs on the display screen 20 and interacts with a menu-driven display routine by touching appropriately prompted areas on the screen 20 to search through the various card designs available in the storage unit 16. The customer can control the order and the rate at which the cards are displayed. Once the customer has selected a card design, he or she may be prompted to deposit money in the coin acceptor 14, and the card would be printed by the printer 22 and vended to the customer.

In this on-site manufacturing and vending system 10, all of the card designs are stored in the database 16, thus eliminating the clumsy and voluminous inventory of actual cards in conventional display racks. A replaceable optical disk is used as the storage medium for the database 16 in the preferred embodiment, although other high density storage units, such as magnetic disk or tape media, solid state electronic data storage media, or the like can also be used advantageously. The extremely high storage density of the optical disk permits a very large number of card designs to be stored on a single optical disk having a diameter of about five inches (12.7 cm) in currently available technology. For example, the storage capacity of such an optical disk is so great than an inventory of designs that once occupied hundreds of lineal feet of display area can be stored on a single optical disk. The invention also conserves natural resources in that only those designs sold are printed in tangible form. Finally, since the disk is replaceable, the card designs can be easily changed or updated.

Several database architectures are possible that will provide convenient storage and retrieval of the various greeting card designs. In the preferred embodiment, the database of card designs is grouped into two individual files for each card: a print file and a display file. The print file contains all of the information necessary to print the selected card design on the printing device, while the display file contains all of the information necessary to display the selected card design on the display device. In this preferred embodiment, the display file for a given card is much smaller than the print file for the same card. This grouping scheme or architecture enhances efficiency by requiring the manipulation of only the smaller, more compact display files during the card selection and review process. The large and cumbersome print file need only be manipulated after a card is selected to be printed.

Other database architectures are, of course, possible. For example, the card designs could all be placed in a single large file that contains all of the necessary information to print and display the card. A temporary, or buffer file could also be used to temporarily store those card designs in the database that have the same special occasion parameters as those input by the customer.

Additionally, a second buffer file could be created that contains subsets of the first temporary file. For instance, a search for a birthday card for a two year old boy might reveal five (5) cards for two-year olds and eight (8) cards that are not age specific. This grouping into subsets could be performed whenever it would aid the customer in the reviewing process.

Still other database architectures are possible for conveniently grouping the database of card designs on the optical, magnetic, or electronic storage medium as would be known to someone skilled in the art. Suffice it to say that myriad database architectures are possible, and the present invention should not be regarded as limited to the architectures described herein.

Each individual card design in the optical, magnetic, or electronic database, however organized, has associated with it several parameters and codes. These parameters and codes fall into three categories: special occasion parameters, charge codes and design licensor identifier codes. The special occasion parameters are those parameters that serve to identify the field of the card. For example, such parameters might be "birthday", "son", and "two-year olds" to define a birthday card for a two-year old son. Each card thus has as many special occasion parameters as are needed to conveniently define the field of the card.

A charge code is associated with each individual card design to indicate the amount of money that should be charged for the card. Depending on the embodiment, this amount would be collected at the coin acceptor, or it can be printed on the back of the card to conform to current practice.

A design licensor identifier code is also associated with each individual card design that is used to create a record of sales to establish the amount of royalty payments to be paid to the owner of each card design. This code is also used to print a copyright notice on each card when appropriate.

In the preferred embodiment, the data input by the customer to define the field of search is received via a touchscreen input. Besides being convenient and easy to use, the touchscreen input system 20 affords greater flexibility in system design. For example, any number of input choices can be presented to the customer in the form of several labeled boxes on the display screen 20 such that they have an appearance similar to buttons. The customer can simply touch the screen area over the labeled "button" to select an indicated option. This design allows the system to display a varying number of choices or "buttons" on each display screen 20, thereby eliminating the need for a large array of individual buttons for each potential option or choice.

In operation of the preferred embodiment 10, the customer initiates the greeting card selection process by touching the screen area 20 over the "start" button that is displayed on the introductory display. The machine 10 then displays a series of queries on the touchscreen 20 for the customer to answer to define the field of card desired. These queries are presented on a number of individual displays and are structured so that the response thereto defines a special occasion parameter. The queries are displayed sequentially on the display screen 20 with the general queries displayed first, and gradually becoming more specific with each succeeding display after a selection by the customer. In this manner, a series of special occasion parameters are received as input to define the field of search. As will be more fully discussed below, different query displays would be used, depending on the type of greeting card desired.

By presenting the customer with a series of predetermined queries that are actually special occasion parameters, the system 10 is able to define the field of the desired card by using the same special occasion parameters that are used to identify each card in the database 16. That is, by prompting the customer with a predefined set of queries, or special occasion parameters, the greeting card reproduction and vending machine 10 avoids having to correlate parameters input by the customer that are different than those predetermined parameters associated with each card in the database 16.

Once the card field has been sufficiently defined by the querying process, the computer 12 searches the database 16 to find those card designs having special occasion parameters that match those input by the customer. Depending on the database architecture, these cards are either directly shown on the display device for review directly, or they are placed in a first or temporary file that is accessed during the card review process. Placing the card designs in the first, or temporary, file eliminates the need to research the entire database 16 each time a new card is to be reviewed.

The reviewing process allows the customer to see and review those cards found in the database search that correspond to the special occasion parameters input by the customer. During the reviewing process, the customer can review the face of each card, open the card, or save a series of favored card designs in a second temporary file for further review. Once the appropriate card is selected, the machine 10 reproduces the card in tangible form on a high quality color printer 22.

Lastly, the greeting card manufacturing and vending machine 10 may have a record keeping device to keep track of the number of each card design sold. Such data could be retrieved from time to time and used for the purpose of establishing royalty payments or card popularity.

The greeting card manufacturing and vending machine 10 of the present invention thereby allows a full inventory of card designs to be displayed on a machine that occupies only a few square feet of floor space. Customer selection of cards is also enhanced by the interactive querying process, which helps the customer to locate quickly the type of card he or she desires. Furthermore, all of the cards in a given field are displayed together. Conveniently, several machines could be placed at a retail location to permit several customers to search for cards at the same time.

Figure 2:
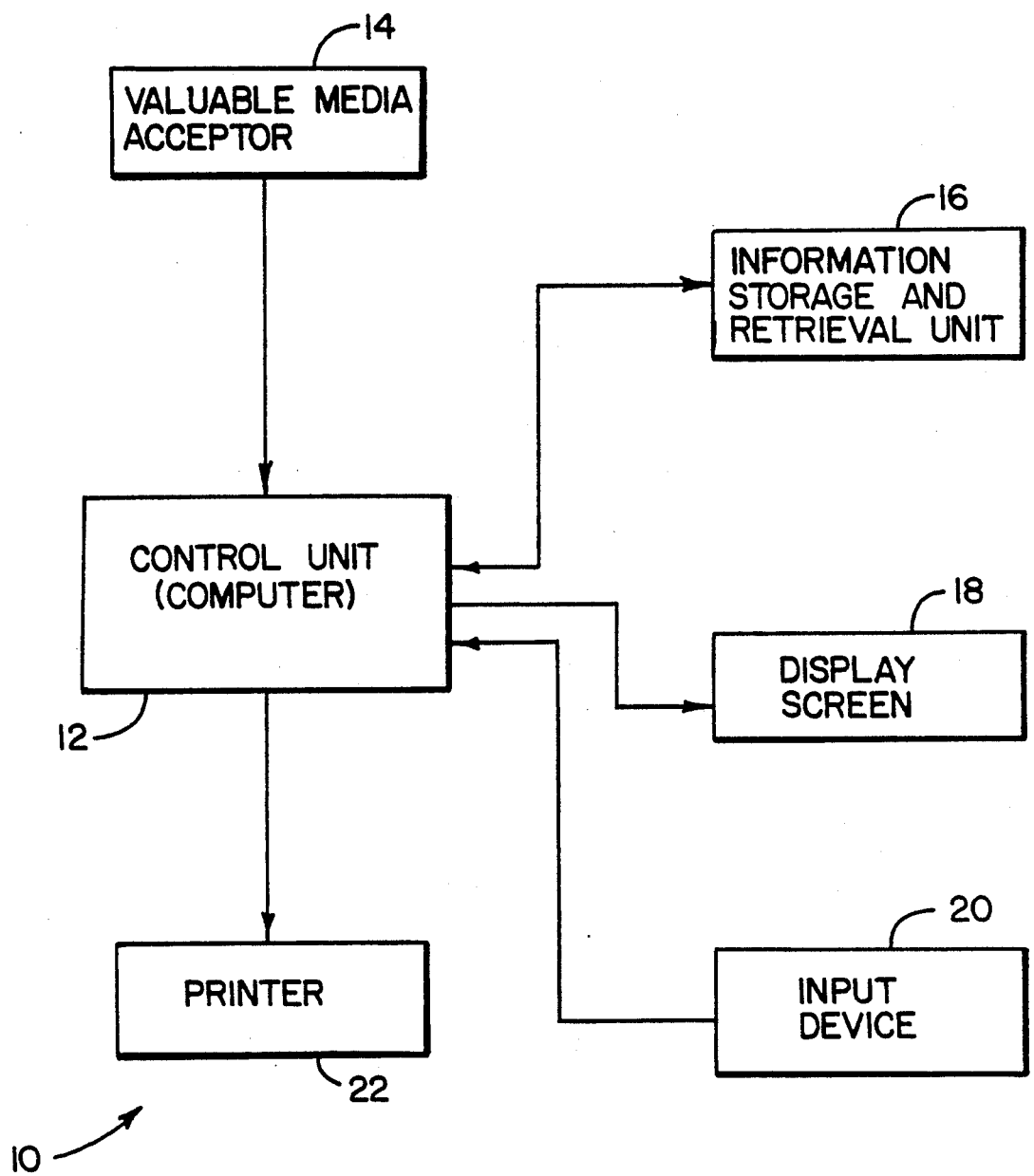
FIG. 2 is a diagrammatic view of the on-site greeting card manufacturing and vending system of the present invention.

The greeting card manufacturing and vending system 10 of the present invention is shown diagrammatically in FIG. 2 and comprises a control unit, or computer 12, an information storage and retrieval unit 16, a display screen 18, an input device 20, a manufacturing unit, or printer 22, and a valuable media acceptor 14. In operation, the computer 12 receives input signals or data from the valuable media acceptor 14, the information storage and retrieval unit 16, and the input device 20, as indicated by the data flow arrows connecting the various components. The computer 12 also sends output signals to the information storage and retrieval unit 16, the display screen 18, and the manufacturing device, or printer 22.

Figure 3:
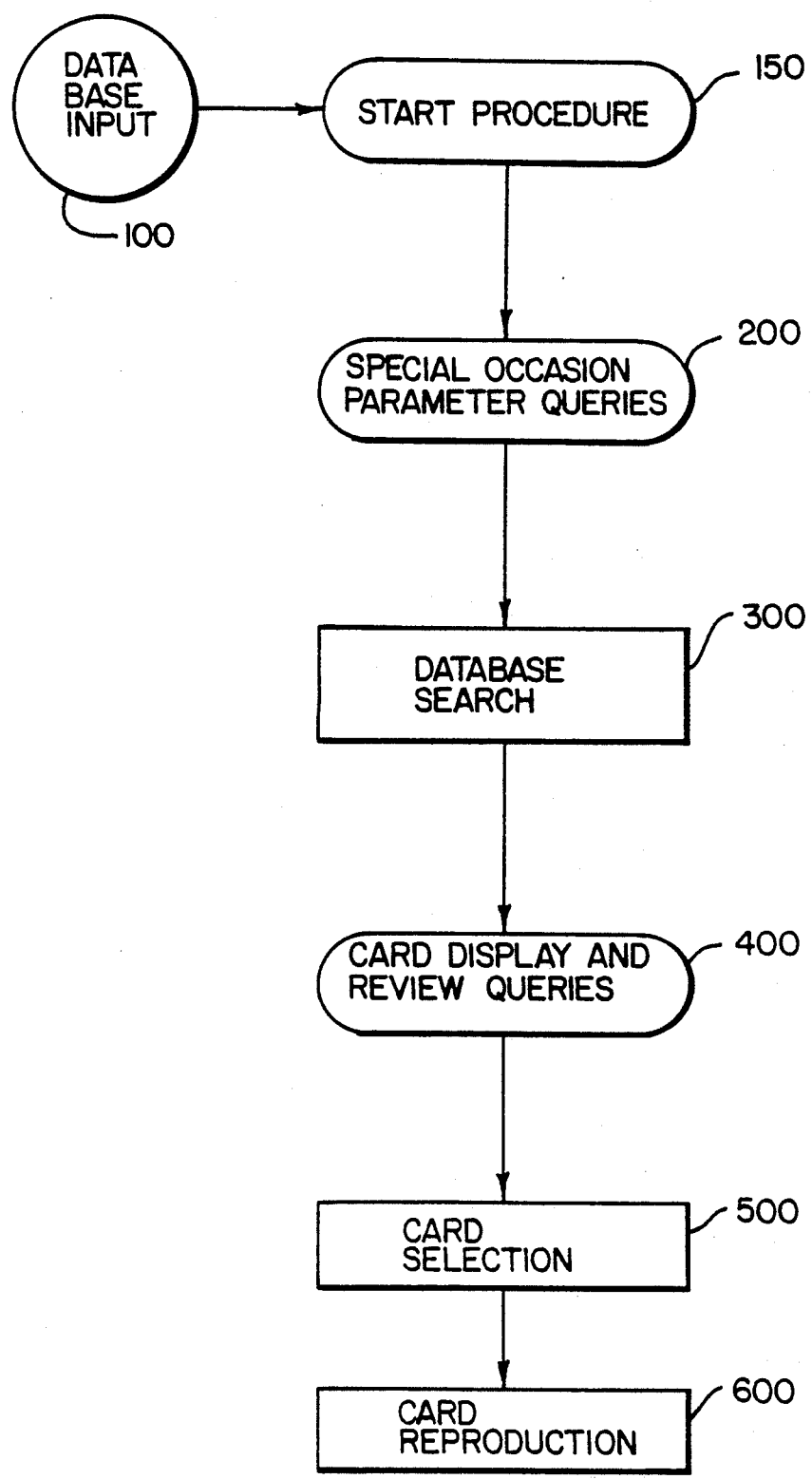
FIG. 3 is a flow chart of the overall method of this invention.

The overall method of operation of the on-site greeting card manufacturing and vending machine 10 is best seen by referring to FIGS. 1, 2, and 3 simultaneously. Briefly, the process of the invention starts at step 100 in FIG. 3 where a database of greeting card designs is placed in the information storage and retrieval unit 16 shown in FIGS. 1 and 2. Step 150 is an introduction and start procedure that displays an appropriate introduction and set of instructions to enable a prospective customer, or card buyer, to begin using the greeting card manufacturing and vending system 10. After the start procedure 150 has been activated by a customer, the method, or program flow, proceeds to process 200, which generates a series of interactive queries on the display screen 18. The queries prompt the customer to input several data set items. Most of these data set items are the special occasion parameters used to define the specific type, or field of greeting card. However, some data set items are used for system control, e.g., "quit", as will be more fully described below. Once all of the special occasion parameters have been input by the customer, the system 10 performs a database search 300 to find those card designs stored in the database 16 having the same special occasion parameters as those input by the customer in step 200. In one preferred embodiment, these cards are then stored in a first temporary file. The system 10 then displays those cards on the display screen 18 at step 400. Step 400 also queries the customer in an interactive manner to review the cards and to make a selection at step 500. Lastly, the selected greeting card is reproduced in tangible form and vended to the customer in step 600.

In the preferred embodiment, the on-site greeting card reproduction and vending system 10 described above is more particularly defined as follows. The information storage and retrieval unit 16 may be, for example, a Hitachi CDR-2500 CD-ROM drive available from Hitachi Sales Corp. of America, 401 West Artesia Blvd., Compton, Calif. 90220. The display screen 18 and input device 20 are preferably combined as a display monitor and touchscreen input device, such as those available commercially from Microtouch Systems, Inc., of 10 State St., Woburn, Mass. 01801, as the Mac II Color Monitor with installed touchscreen. The printer 22 may be, for example, a Pixelmaster Printer available from Howtek, Inc., 21 Park Ave., Hudson, N.H. 02051. An appropriate valuable media acceptor 14 is available from Mars Electronics, 1301 Wilson Drive, West Chester, Pa. 19380. Finally, the computer 22 may be a MacIntosh II computer available from the Apple Computer Company, 20525 Mariani Ave., Cupertino, Calif. 95014. Other components and devices could, of course, be used as substitutes for the foregoing. For example, the display screen 18 may be monochrome rather than color and the printer may be of a type that prints only one color. The input device 20 could be a trackball, keyboard, or mouse instead of a touchscreen. The valuable media acceptor could be eliminated, and the printed card taken to a checkout counter for payment, or it could be some other qualifier device, such as a code, remote controlled switch, or whatever is desired by the retailer or vending machine owner to qualify approved users or customers.

It is anticipated that the method of the present invention will be most easily performed by programming the computer 12 to execute the steps of the method of the invention. Therefore, the following description will refer to conventional flow charts to explain the detailed processes of the method.

Figure 4:
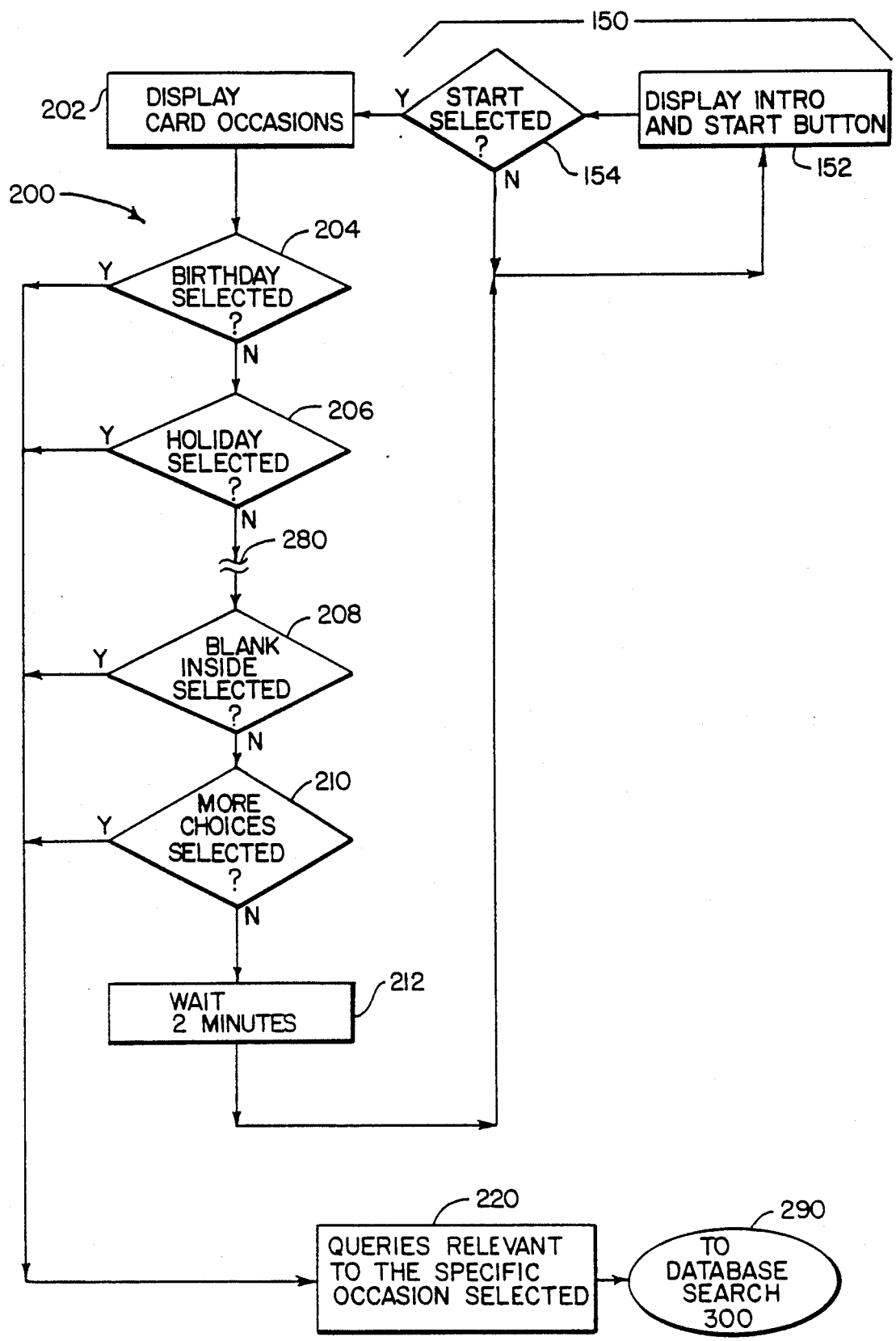
FIG. 4 is a detailed illustration of the Special Occasion Parameter Queries step of FIG. 3.

The step of database input 100, and introduction and start procedure 150 are best understood by referring to FIGS. 3 and 4. The step of database input 100 may comprise simply inserting an optical disk or other mass storage media containing a database of greeting card designs into the optical disk or other drive 16, or it may also be considered to include the step of writing the information containing the designs onto the optical disk or other storage media. As discussed earlier, each greeting card design has associated with it several identifying flags in the form of one or more special occasion parameters, a charge code and a design licensor identifier code. Since the methods of placing such identifying flags or characteristics along with a digitized representation of a card onto an optical disk or other storage media are well-known in the data storage and handling art they will not be described in detail. Suffice it to say that they may be encoded as address marks in a typical manner or pattern according to the design of the optical disk or other storage media, which is usually implemented by commercially available data base or other software.

Referring to FIG. 4, step 150 comprises an introductory display procedure 152 and start procedure 154 to display a series of instructions on the display screen 18 for customers. As discussed earlier, the display may present a brief description of the function and operation of the machine, a brief set of instructions, and a start "button" for the customer to touch when he or she is ready to initiate the greeting card selection procedure. In the preferred embodiment with the touchscreen input, the selection process is initiated when the customer touches the screen area over the start button. This start signal is detected by decision process 154, which directs the program flow to step 202. Step 202 is the first step in the query process 200 and causes the computer 12 to generate the display shown in FIG. 8. This step 202 informs the customer of the various card occasions available by displaying a series of predetermined special occasion parameters 204', 206', 208', and 210'.

Figure 8:
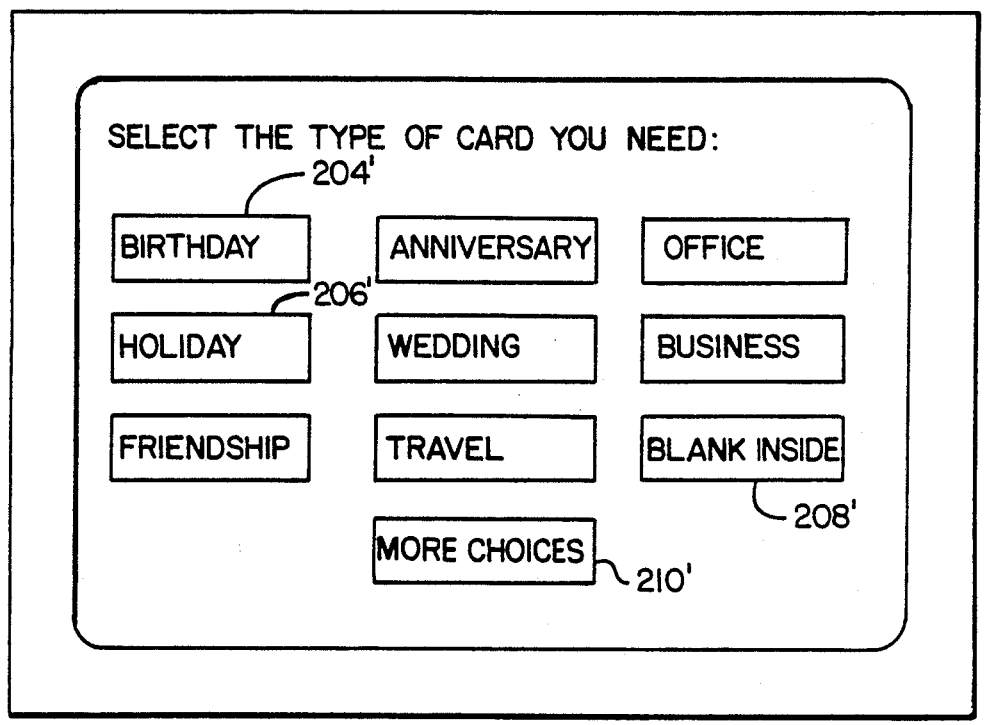
FIG. 8 is a representative display that queries the customer for a card occasion.

This method 200 of inputing special occasion parameters is most easily understood by referring to FIGS. 4 and 8 simultaneously. A number of occasions 204', 206', 208', and 210' are shown on the display screen of FIG. 8 which correspond to the decision processes 204, 206, 208, and 210 of FIG. 4. In the preferred embodiment that utilizes the touchscreen input, customer response would be detected as an input when the customer touches the screen over the appropriate box or button 204', 206', 208' or 210'. The corresponding decision process 204, 206, 208 or 210 detects the input and directs the program flow to step 220. Note that the flow chart of FIG. 4 omits the decision processes that correspond to un-numbered boxes or buttons of FIG. 8. These processes have been omitted from FIG. 4 in the interest of brevity, and are instead represented by the break 280. Furthermore, the number of occasions available could easily exceed those shown for illustrative purposes in FIG. 8, and the method of the present invention should not be considered as limited to the number or type of choices shown in the sample displays. In any event, the number of decision processes such as 204 and 208 must correspond to the number choices displayed on the screen shown in FIG. 8.

If no selection is detected from the display shown in FIG. 8, the program flow pauses at step 212 for a predetermined time. In the preferred embodiment, a time period of, for example, two minutes is specified. If no input is detected within this time period, the program returns to the display introduction step 152. This procedure allows the system 10 to automatically reset to allow use by another customer in the event it is abandoned by the first customer.

As can be seen in FIG. 4, a selection of any occasion 204', 206', 208' or 210' from the display of FIG. 8 results in the program flow being directed to step 220. Step 220, as shown in FIG. 4, is an abbreviation of the actual steps that would be executed after the selection of a card occasion. In reality, step 220 contains different queries for each occasion 204', 206', 208', or 210' from the display shown in FIG. 8. Stated another way, the types of queries required to refine the search for a birthday card would be quite different than those that would be required to refine a search for a sympathy card. Therefore, for brevity, convenience, and ease of explanation, step 220 is described below as it exists for a birthday occasion. However, it must be recognized that the program steps for the birthday occasion are essentially the same as those required for any other occasion. The only difference would be those particular questions or queries for a given step in the process 220.

Figure 5:
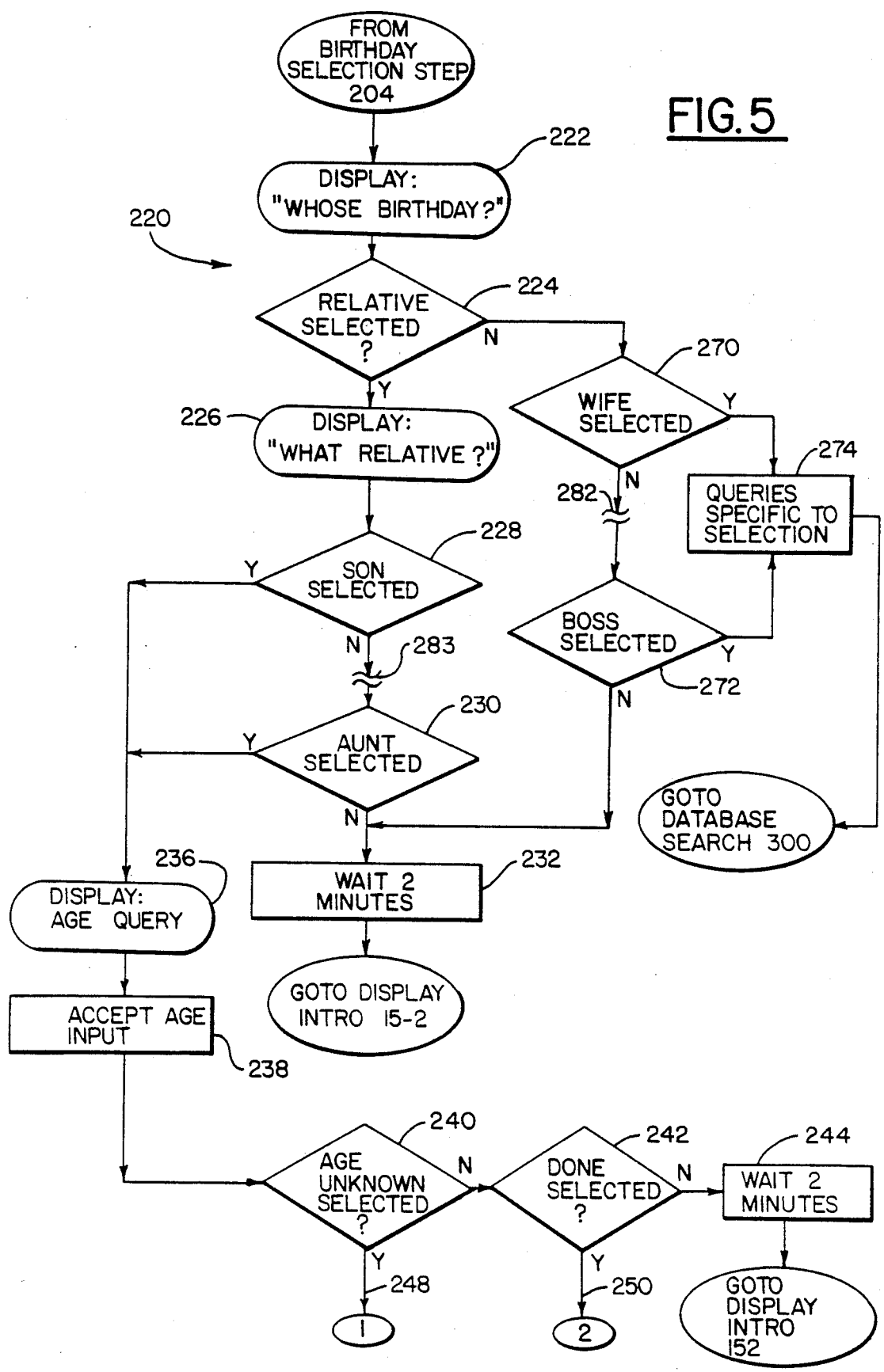
FIG. 5 is a detailed illustration of the Queries Relevant to the Specific Occasion Selected step of FIG. 4.
Figure 5A:
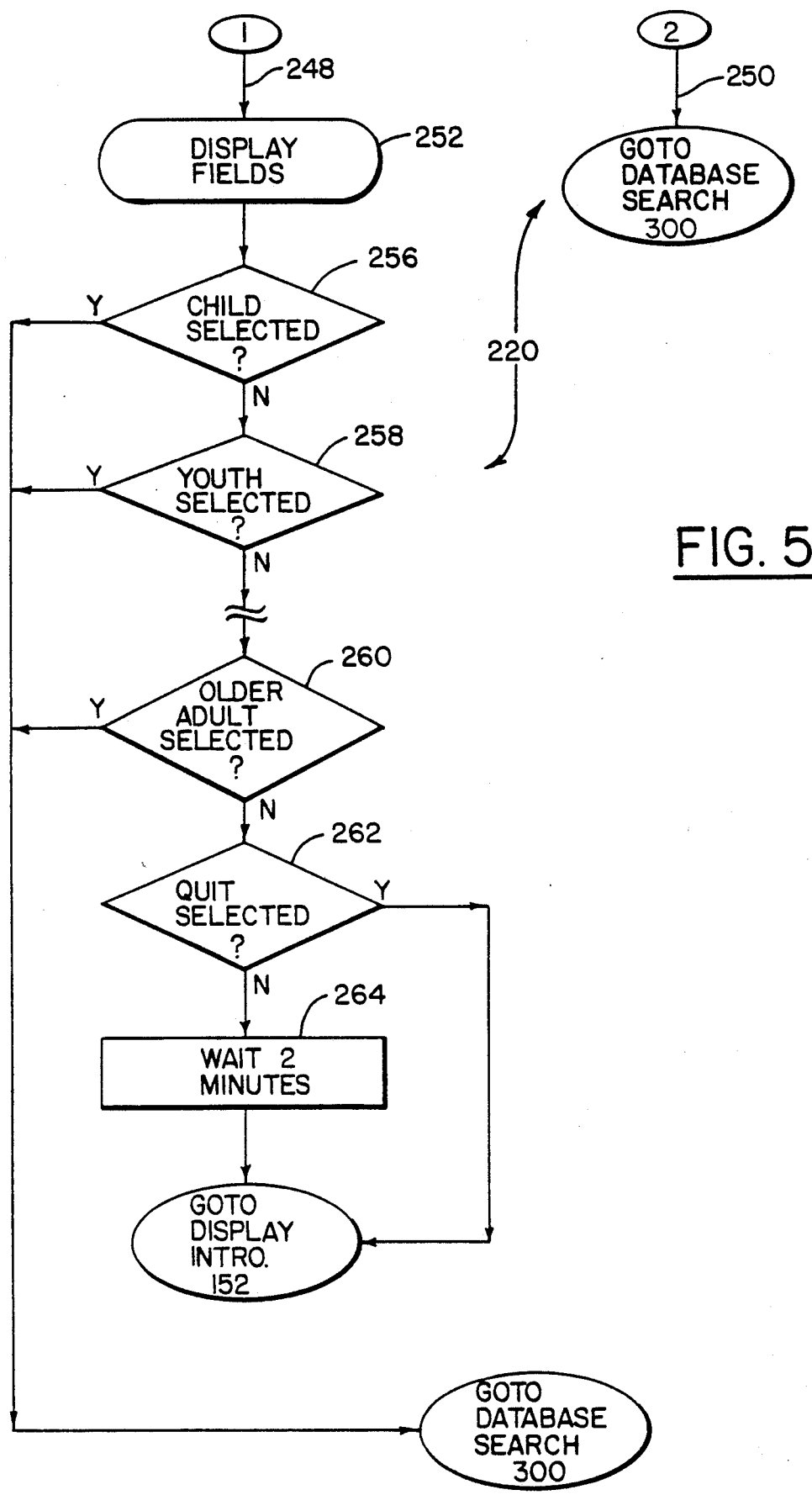
FIG. 5a is a continuation of the flow chart of FIG. 5.

Referring now to FIGS. 5 and 5a, step 220 can be described in detail as it would appear if step 204 detected a "birthday" selection. The first step executed is step 222 display, such as, "whose birthday?". This step directs the computer 12 to generate the display shown in FIG. 9. As was the case for FIGS. 4 and 8, a number of various choices, or buttons 224', 270', and 272' are displayed for the customer with the corresponding decision processes 224, 270, and 272 in FIG. 5 shown in condensed form with break lines 282 indicating where the decision processes belong that correspond to the remaining un-numbered choices, or buttons of FIG. 9. Also, like FIG. 4, each decision process 270 through 272 directs the program flow to process 274 that is shown as a generic, or abbreviated, step as was step 220 in FIG. 4, because the particular steps of process 274 present different queries for each individual choice selected from FIG. 9. Again, since the basic method is similar for each choice, only that portion of step 274 relating to the "relative" selection 224' is shown and described.

Figure 10:
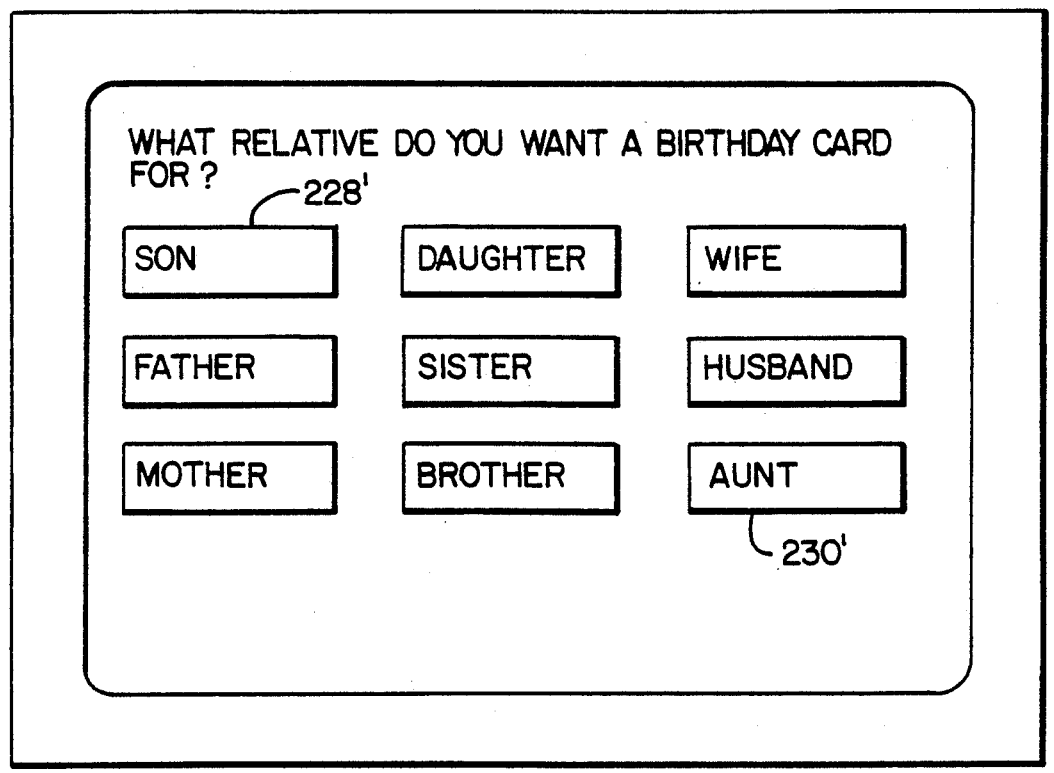
FIG. 10 is the query displayed if the choice selected in FIG. 9 was "relative"

Once the "relative" selection 224' is detected by step 224, the method proceeds to step 226, which generates the display shown in FIG. 10. Here again, the display presents a number of choices 228' and 230' for the customer to make, which choices are detected by the corresponding detection processes 228, and 230 shown in FIG. 5. As before, break lines 283 indicate the locations of the selection processes for each choice, or button, shown in the display of FIG. 10.

As was the case for the first display step 202 of FIG. 4, display steps 222 and 226 await an input or selection for a preset period of time, such as two minutes, at step 232. If no selection is made within that time period, the computer 12 returns to the display introduction step 152.

Figure 11:
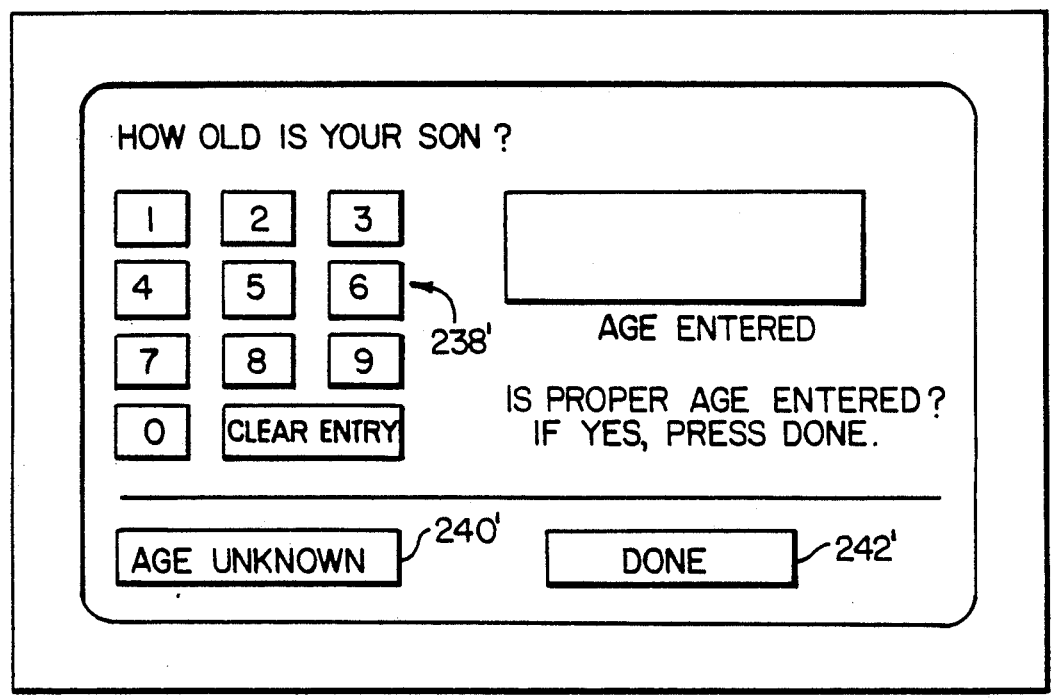
FIG. 11 is the query displayed if the choice selected in FIG. 10 was "son"
Figure 12:
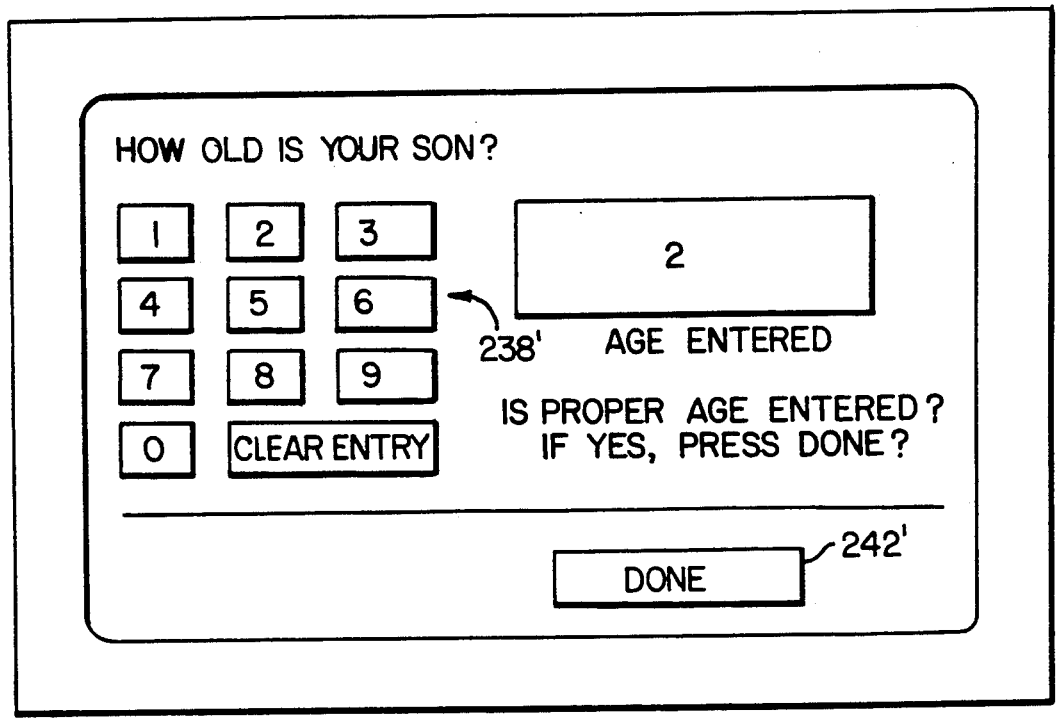
FIG. 12 is the query displayed if the age selected in FIG. 11 was "2"

Once an input is detected by 228 through 230 from the display shown in FIG. 10, the program proceeds to step 236, which generates the display illustrated in FIG. 11. This display query requests that the customer enter age data. This query allows the customer to either input a specific age 238, or input "age unknown" 240'. If the customer inputs a specific age, it is received via the age input buttons 238'. Once the age is input, it is displayed as shown in FIG. 12. If the age displayed is correct, the customer would touch "done" 242' to direct the computer 12 to initiate the database search 300.

If, on the other hand, the customer selects "age unknown" 240', the process would proceed via path 248 in FIGS. 5 and 5a to display a number of queries 252 to identify an appropriate age group. Those queries are not shown in a display, but could be of the type indicated by decision processes 256, 258, 260, and 262. As with each display query, there is a timed wait procedure 264, e.g., two minutes, to allow the program to return to the display introduction step 152 should the customer abandon the card selection process.

The field of search for a birthday card has now been completely defined by process 220, and the database search step 300 can now be performed to locate those cards that have the same special occasion parameters as those input.

Conveniently, the database search step 300 can be structured to place all of the corresponding greeting cards into one temporary card file, or it can be structured to divide them into several files; grouping them according to those cards found with all of the input special occasion parameters and those found with less than the total number of parameters. These files are referred to as specific and nonspecific files respectively. The methods for performing such a database search and grouping the data into subsets are well known in the art of data handling and will therefore not be described in detail.

Figure 13:
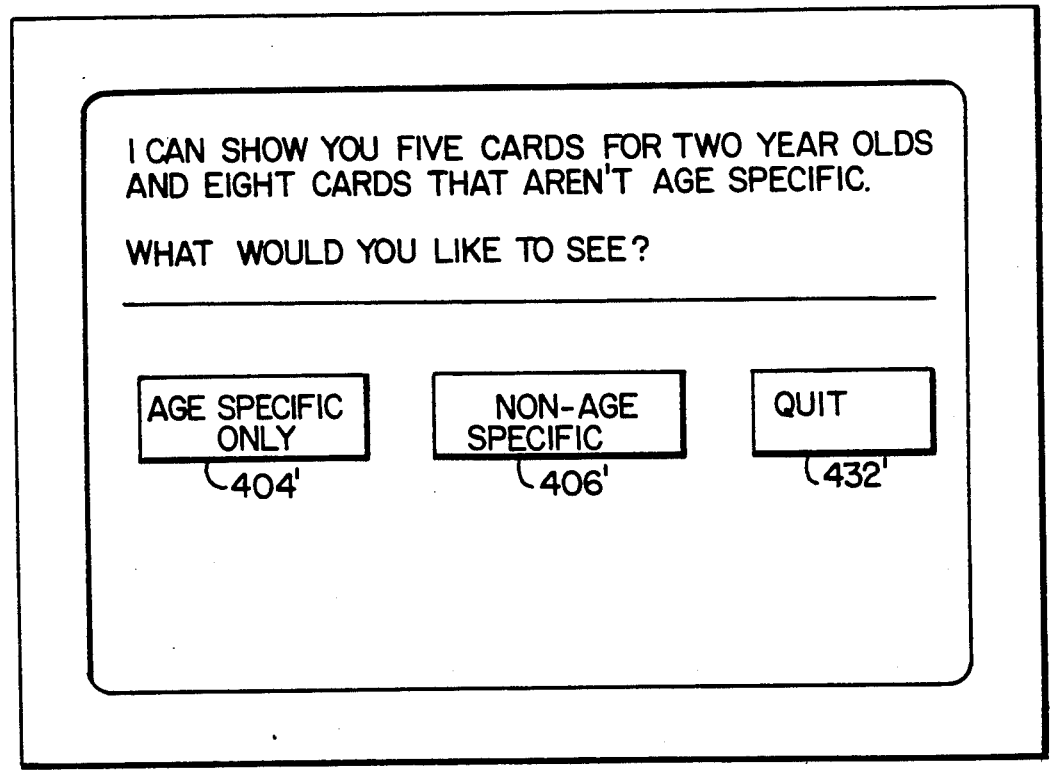
FIG. 13 is the query displayed after the database search.
Figure 14:
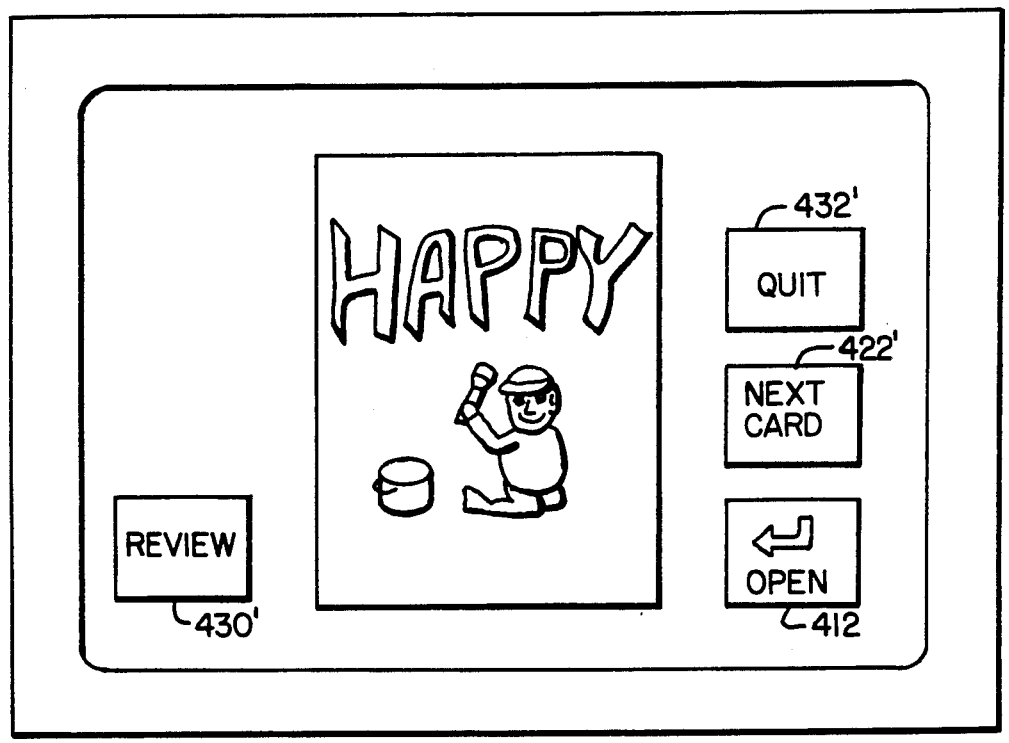
FIG. 14 is a representative display showing the front of a greeting card and a query for the customer if the choice selected in FIG. 13 was "age specific only"
Figure 15:
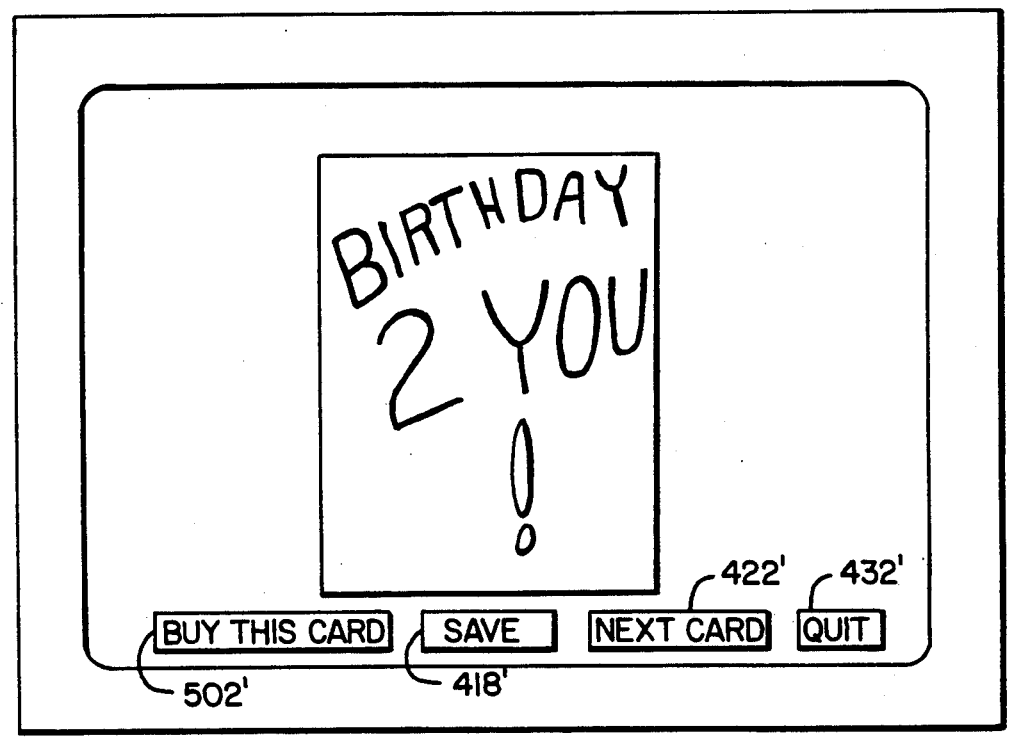
FIG. 15 is a representative display showing the inside of the greeting card and a query for the customer if the choice selected in FIG. 14 was "open"; and, FIG. 16 is a diagrammatic view of a modified embodiment of the on-site greeting card manufacturing and vending system.

After the search 300 is completed, the reviewing step 400 directs the computer 12 to generate several displays such as those shown in FIGS. 13, 14, and 15. These displays allow the customer to view the displayed card designs and make an appropriate selection.

Figure 6:
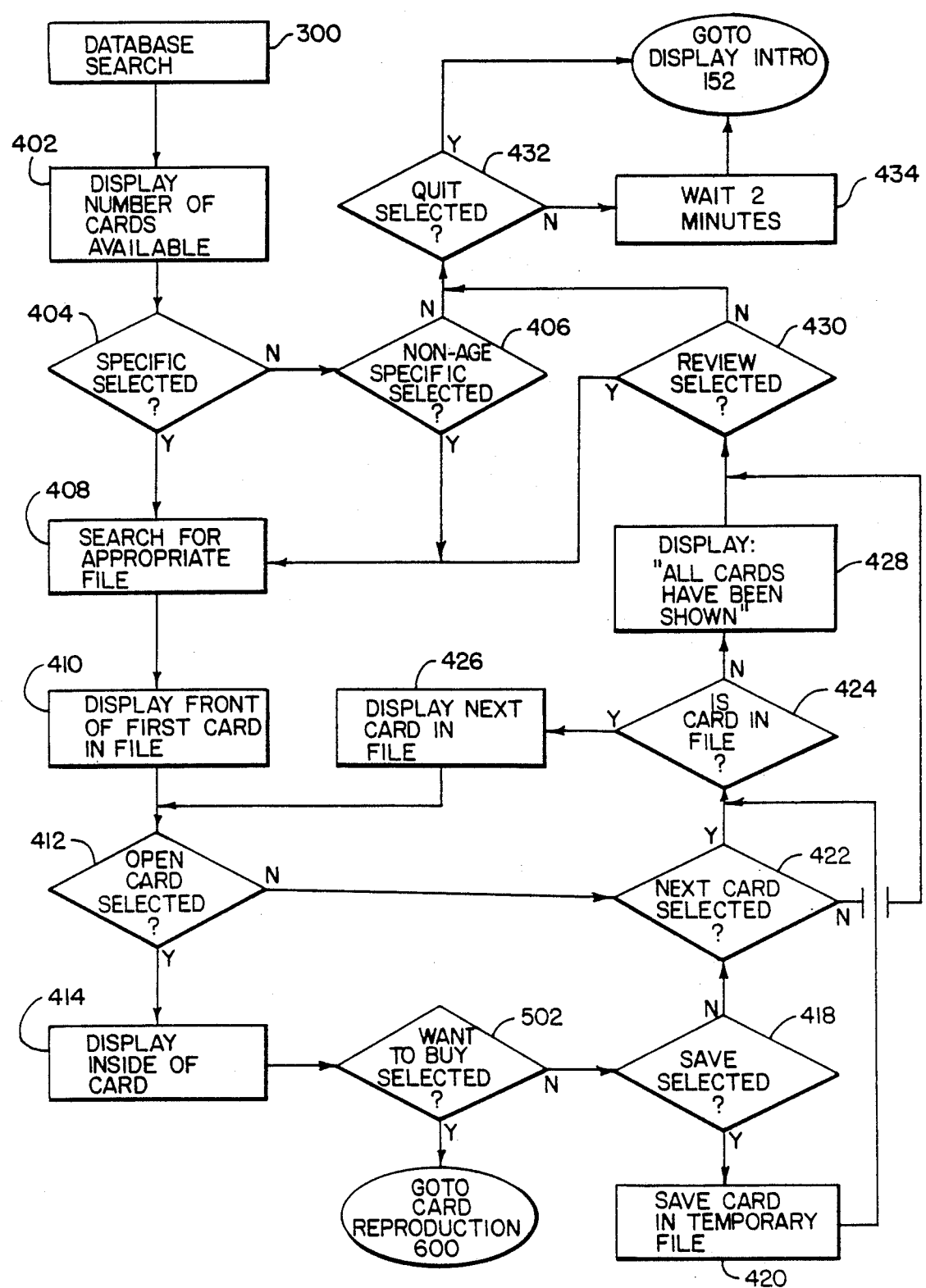
FIG. 6 is a detailed illustration of the Card Display and Review Queries and Card Selection steps of FIG. 3.

The steps in the process 400 are set forth in detail in FIG. 6. Step 402 is the process that actually directs the computer 12 to generate the display of FIG. 13. This display informs the customer of the results of the search. By way of example, the quantity of specific and nonspecific cards found are indicated, for example, as shown in FIG. 13, though other information could also be presented. Decision processes 404, 406, and 432 await input from the corresponding choices or buttons 404', 406', and 432' of FIG. 13. If the customer selects choices 404' or 406' the flow of the process is directed to step 408 that searches for the appropriate file, i.e., either the specific or non-specific file, and displays the first card in the file at step 410. If "quit" 432' is selected, the system returns to the display introduction step 152.

The display generated by the computer 12 by the execution of step 410 is shown in FIG. 14. Decision processes 412, 422, 430, and 432 await input from the customer from one of the corresponding choices, or buttons 412', 422', 430'or 432' shown on the display of FIG. 14. Here again, the computer 12 waits for the customer to make a selection for a period of time, such as two minutes, at step 434 before returning to the introductory display 152.

Referring to FIG. 6, if "open card" 412 is selected, step 414 directs the computer 12 to display the inside of the card, such as that shown in FIG. 15. When the inside of a card is displayed, the customer can select to buy the card 502', save the card 418' in a second temporary file 420, see the next card 422', or quit 432'. If decision process 502 detects that the customer pressed choice 502', the computer 12 proceeds to step 600 to reproduce and vend the selected card. If the customer pressed choice 418', to save the card design for later review, the card will be saved in a second temporary file 420, and the program will make a check 424 to determine if all the cards in the file have been shown. If they have not, step 426 will display the next card in a display similar to that of FIG. 14. If all the cards have been shown, a suitable display is generated by step 428 and the customer can either quit 432 or review the cards 430' in the temporary file 420.

Referring back to FIG. 14, the customer could elect to view the next card immediately by touching 422' instead of opening the card by the process described above. If next card 422' is touched, check 424 is made and the computer will display the next available card at step 426 or display an appropriate message 428 indicating that all cards have been shown. At this stage, the customer could elect to review the cards 430, or quit 432. The customer can repeat any combination of the above-described procedures for card review until he or she makes a selection. In this manner, the customer can control the rate at which the cards are reviewed, as well as the number to be reviewed by saving only those cards of interest in the second temporary file 420. The customer could theoretically continue this process until the choice is narrowed to one or two cards.

Figure 7:
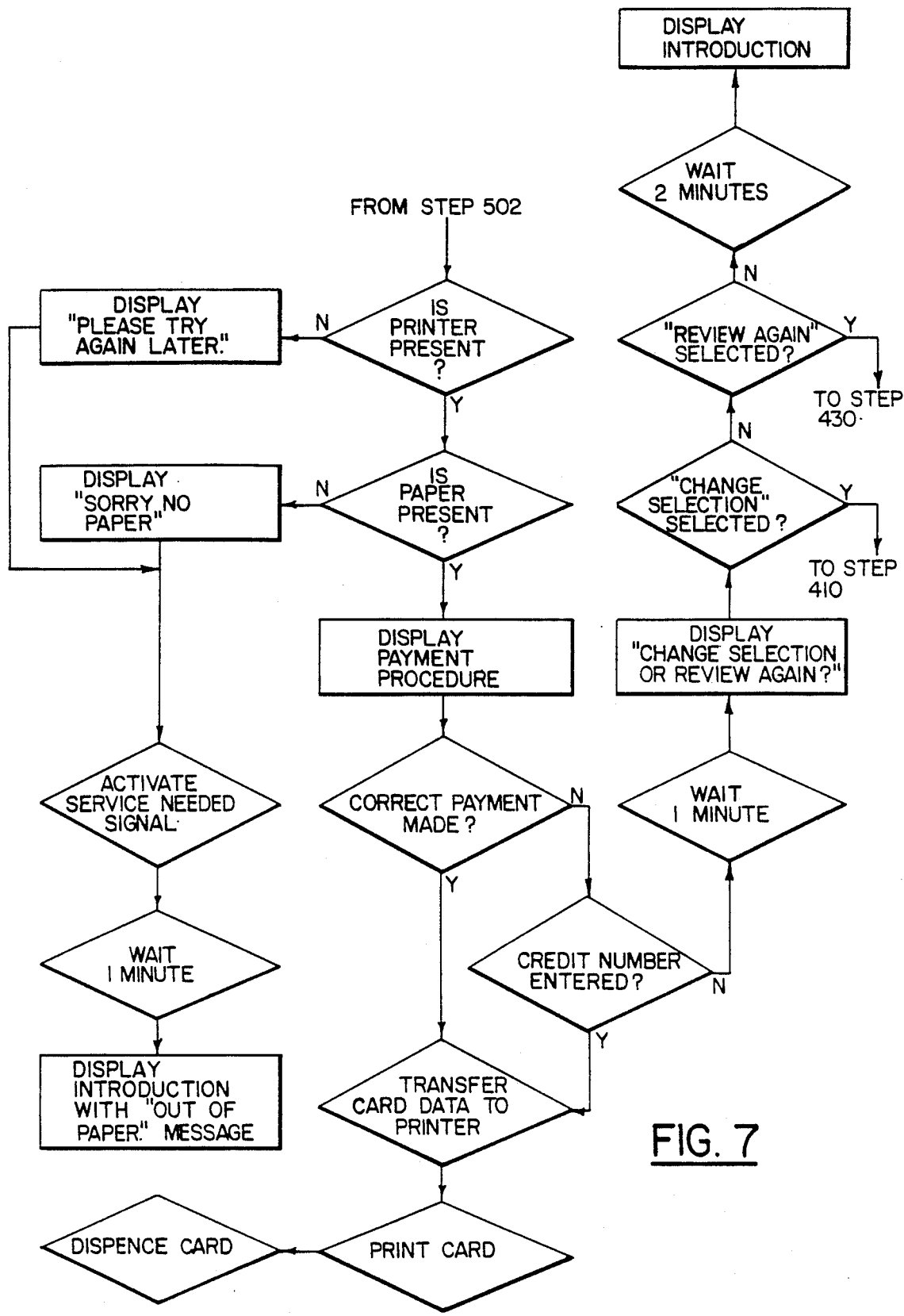
FIG. 7 is a detailed illustration of the Card Reproduction step of FIG. 4.

After a card selection is entered by touching 502', the process would advance to step 600 shown in FIG. 3 to manufacture and vend the greeting card. The card manufacturing and vending procedure 600 of FIG. 3 is shown in more detail in FIG. 7 and is virtually self-explanatory. Therefore, since it is well known in the art to vend items in conjunction with a valuable media acceptor, such as a coin acceptor, this step will not be discussed in any more detail than that shown in FIG. 7.

The operation of the greeting card reproducing and vending machine 10 can be more easily understood by referring to a specific example. Suppose a customer desires a birthday card for his two-year old son. Upon activation of the start procedure 150 of FIGS. 3 and 4, the customer would be presented with the display of FIG. 8. Since he is looking for a birthday card, he would press choice 204' on the touch screen 20. The computer 12 detects this input at step 204 of FIG. 4, and proceeds to step 220 to further refine the field of search.

Figure 9:
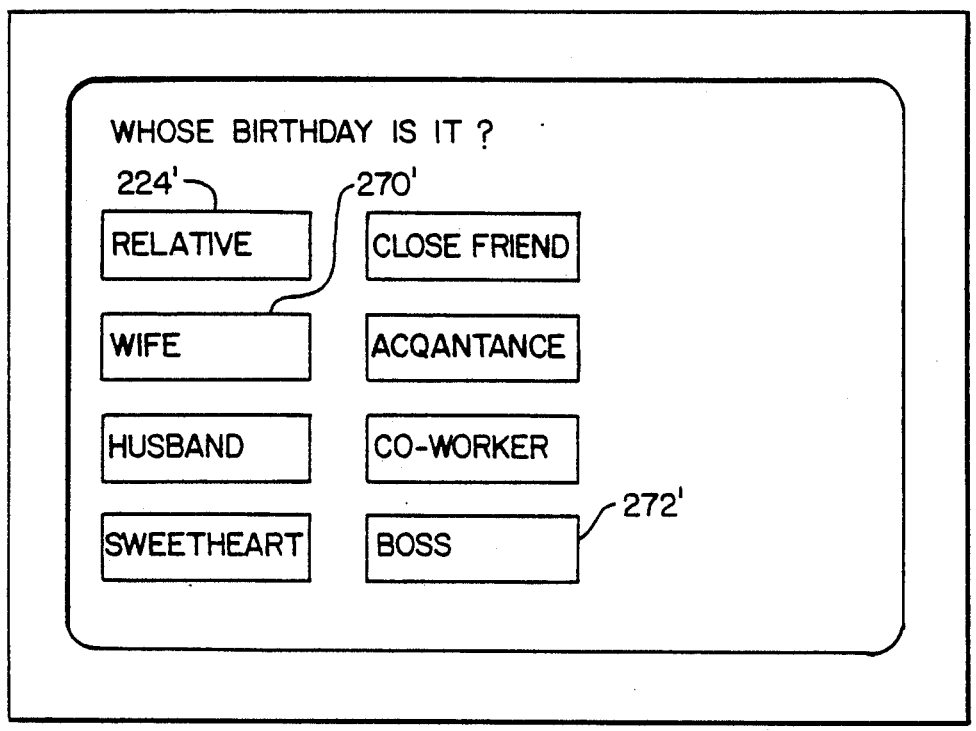
FIG. 9 is the query displayed if the choice selected in FIG. 8 was "birthday"

Referring back to FIGS. 5 and 5a, step 220 for a birthday selection would start at step 222 that directs the computer 12 to generate the display shown in FIG. 9. Since the birthday card is to be for his son, the customer would touch button 224' "relative". This input is detected at step 224 which then directs the computer 12 to step 226 to generate the display of FIG. 10. The customer would touch button 228' "son" thus directing the computer 12 to display step 236 to generate the display of FIG. 11. The customer would then touch the "2" button of age input buttons 238' and the computer 12 would update the display to that shown in FIG. 12. Since two is the proper age, the customer would touch 242' "done" to initiate the search process 300. This completes the step 200 that queries the customer to input a plurality of special occasion parameters. The interactive method of the display procedure ensures that the special occasion parameters input by the customer are the same as those parameters that are used to identify each card design in the database. By prompting the customer to choose from among several predetermined parameters, a very efficient search of the database of card designs can be accomplished without the need for special correlation procedures to correlate non-standard parameters that would otherwise be input by customers.

When the database search 300 is completed, step 402 (FIG. 6) directs the computer to display the results of the search (FIG. 13). As discussed earlier, the cards found in the database search are divided into two files, those cards that met all of the input special occasion parameters, and those found that did not. Since five cards were found for two-year olds, the customer would touch box 404' in FIG. 13. The computer then searches the age specific file, and displays the face, or front of the first card in FIG. 14. The "open" button 412' is touched, and the computer 12 displays the inside of the card in FIG. 15. To reproduce the card, the customer would touch 502' and the on-site greeting card manufacturing and vending machine would print and vend the card.

Figure 16:
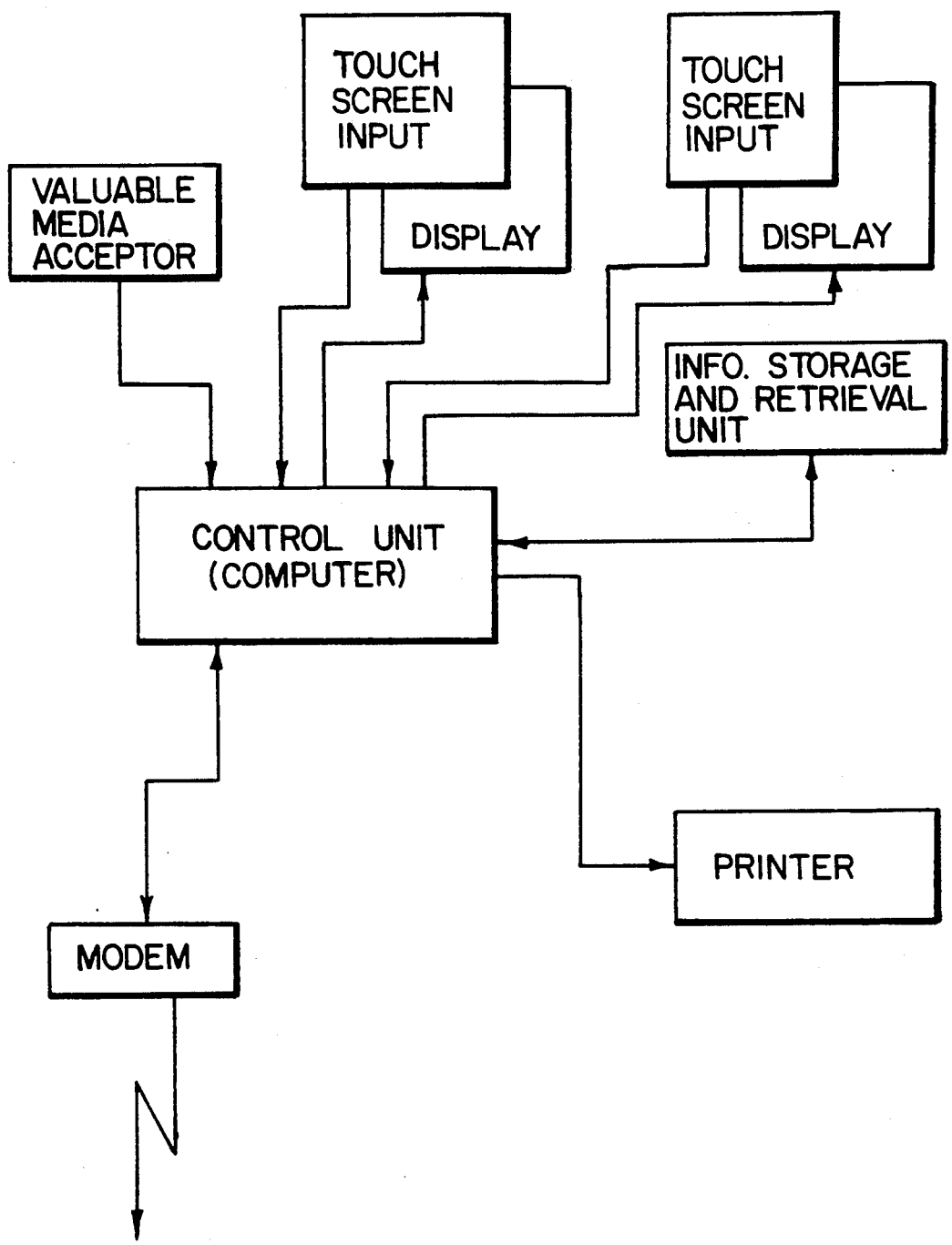

In another preferred embodiment, shown in FIG. 16, a communication modem 26 could be used to transfer data regarding card sales, machine performance, trouble or other data to a remote data collection and service location. This alternative embodiment could also have two or more displays and touchscreens connected to the computer, the exact number being determined by a variety of factors such as cost, computer capability, performance, etc.

Another variation to the embodiment shown in FIG. 16 would be to use a first display screen solely to display the menu-driven special occasion parameter queries, while using a second display screen for displaying only the card designs. Such as variation would be advantageous in that the first display screen could be a simple and inexpensive monochrome monitor of a large enough size to allow easy selection of the various displayed parameter choices. The second display could then be a more expensive color monitor, but could also be smaller than the first display in an attempt to reduce the overall cost of the system, or to enhance the operability of the system.

This variation of using a separate menu-driven query display and a separate display to show the card designs would be easy to implement, requiring only that the query signals generated by the computer 12 be sent to the first display screen while sending the signals to display the card designs to the second display screen.

The foregoing is considered as illustrative only of the principles of the invention. Further, since numerous modifications and changes will readily occur to those skilled int he art, it is not desired to limit the invention to the exact method as shown and described above. Accordingly, all suitable modifications and equivalents may be considered as falling within the scope of the invention as defined by the claims which follow.

The embodiments of the invention in which an exclusive property or privilege is claimed are defined as follows:

1. A method of the on-site manufacture and vending of social expression cards, comprising the steps of:
   inputting a plurality of social expression card designs into an information storage and retrieval system for storing, referencing, and retrieving the social expression card designs, where each of the social expression card designs comprises a front page and an inside page and each social expression card design is uniquely identified by a plurality of special occasion parameters, and where the special occasion parameters are used to group social expression card designs with like special occasion parameters into fields;

querying the customer for a plurality of input data set items, all of the plurality of input data set items being special occasion parameters to identify a field of social expression card designs;

searching the information storage and retrieval system for social expression card designs having special occasion parameters that match those input by the customer;

displaying those social expression card designs having special occasion parameters that match those input by the customer;

selecting a social expression card design to be reproduced; and reproducing said selected social expression card design in tangible form.

2. The method of claim 1, wherein the step of displaying the social expression card designs is defined further to include the steps of:

temporarily storing those social expression card designs having special occasion parameters that match those input by the customer as a first file; and displaying those social expression card designs in said first file.

3. The method of claim 2, where the step of displaying the card designs in said first file is defined further to include the steps of:

displaying the front page of a first card design in the first file;

querying the customer to determine if he or she wants to see the inside page of the first card design;

displaying the inside page of the first card design;

displaying the remaining card designs in the first file in a similar manner until all the card designs have been displayed; and, querying the customer to select a card design to be reproduced in tangible form.

4. The method of claim 3, including the step of selecting and saving as a second file certain ones of said social expression card designs in such a manner that said second file is a subset of said first file.

5. The method of claim 3, including the step of displaying each of the social expression card designs in the first file for review in forward sequence.

6. The method of claim 3, including the step of displaying each of the social expression card designs in the first file for review in reverse sequence.

7. The method of claim 2, including the step of controlling the rate at which the social expression card designs are displayed.

8. The method of claim 2, including the step of displaying more than one social expression card design simultaneously.

9. The method of claim 1, further comprising the step of entering in said information storage and retrieval system an accounting indicator for each social expression card of a specific design that is reproduced and accumulating the accounting indicators into a statistical record of the number of each social expression card design that was sold.

10. The method of claim 1, further comprising the steps of:

assigning a predetermined charge code to each social expression card design in said information storage and retrieval system, each of said charge codes being associated with an amount of money charged for a particular social expression card design;

displaying the amount of money charged in response to said step of selecting a social expression card design to be reproduced and instructing the customer to make a payment of that amount of money;

detecting when said customer makes said payment; and reproducing the selected social expression card design in tangible form in response to said payment.

11. Apparatus for the on-site reproduction and vending of social expression cards in response to a plurality of input data set items provided by a customer, comprising:

information storage and retrieval means for storing, referencing, and retrieving a plurality of social expression card designs, each of said social expression card designs being uniquely identified by a plurality of special occasion parameters;

querying means for querying the customer to select from among the plurality of input data set items, where all of said plurality of input data set items are special occasion parameters that identify types of social expression card designs;

display means for displaying those social expression card designs that have special occasion parameters that match those special occasion parameters selected by the customer;

reproducing means for reproducing special expression card designs in tangible form; and control means connected to said information storage and retrieval means, querying means, display means, and reproducing means for controlling and coordinating the operation thereof.

12. The apparatus of claim 11, further comprising valuable media accepting means connected to said control means for accepting payment from the customer for reproduced social expression cards.

13. The apparatus of claim 11, wherein the querying means comprises input means connected to said computing means for accepting input of the plurality of input data set items, and query display means for displaying queries for the plurality of input data set items.

14. The apparatus of claim 11, wherein the information storage and retrieval means comprises a compact disk optical ROM drive.

15. The apparatus of claim 11, wherein the display means comprises video display for electronically displaying greeting card designs.

16. The apparatus of claim 11, wherein the reproducing means comprises a printer.

17. The apparatus of claim 13, wherein the query display means and input means comprises respectively a video display and a touchscreen.

18. The apparatus of claim 13, wherein the input means comprises a trackball.

19. The apparatus of claim 13, wherein the input means comprises a keyboard.

20. The apparatus of claim 13, wherein the input means comprises a mouse.

21. The apparatus of claim 13, wherein the query display means and the display means are combined.

* * * * *

UNITED STATES PATENT AND TRADEMARK OFFICE
CERTIFICATE OF CORRECTION

PATENT NO.  : 5,056,029
DATED       : Oct. 8, 1991
INVENTOR(S) : Thomas G. Cannon It is certified that error appears in the above-identified patent and that said Letters Patent is hereby corrected as shown below:

In column 12, line 48, change "int he" to --in the--

In column 14, line 30, change "special" to --social--

Signed and Sealed this

Tenth Day of August, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,056,029
DATED : OCTOBER 8, 1991
INVENTOR(S) : THOMAS G. CANNON

It is certified that error appears in the above-identified patent and that said Letters Patent is hereby corrected as shown below:

Col. 14, claim 11, line 30, delete "reproducing means for reproducing special expression card designs in trangible form" and insert --reproducing means for reproducing social expression card designs in tangible form--

Col. 14, claim 13, lines 41-42, delete "input means connected to said computing means" and insert --input means connected to said control means--

Signed and Sealed this

Sixteenth Day of November, 1993

Attest:

BRUCE LEHMAN

Attesting Officer

Commissioner of Patents and Trademarks